US012579126B2

(12) United States Patent
Serout et al.

(10) Patent No.: US 12,579,126 B2
(45) Date of Patent: Mar. 17, 2026

(54) METHOD AND APPARATUS FOR DETECTING MANIPULATION OF A TECHNICAL DEVICE IN A MOTOR VEHICLE UTILIZING METHODS OF ARTIFICIAL INTELLIGENCE

(71) Applicant: Robert Bosch GmbH, Stuttgart (DE)

(72) Inventors: Adrien Serout, Stuttgart (DE); Jens Stefan Buchner, Bietigheim-Bissingen (DE); Markus Hanselmann, Stuttgart (DE); Nicolas Ide, Gerlingen (DE); Stefan Nagel, Waiblingen (DE); Thomas Branz, Stuttgart (DE); Thilo Strauss, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 17/445,356

(22) Filed: Aug. 18, 2021

(65) Prior Publication Data

US 2022/0067023 A1 Mar. 3, 2022

(30) Foreign Application Priority Data

Aug. 25, 2020 (DE) ............................ 102020210727

(51) Int. Cl.
G06F 16/23 (2019.01)
G06N 3/045 (2023.01)
G06N 3/088 (2023.01)

(52) U.S. Cl.
CPC ......... G06F 16/2365 (2019.01); G06N 3/045 (2023.01); G06N 3/088 (2013.01)

(58) Field of Classification Search
CPC ............. G06F 16/0365; G06F 16/2365; G06F 21/552; G06F 21/566; F01N 2610/02;
(Continued)

(56) References Cited

U.S. PATENT DOCUMENTS

2010/0043397 A1* 2/2010 Wang .................... F01N 11/007
60/276
2017/0182447 A1* 6/2017 Sappok ................. F01N 11/005
(Continued)

FOREIGN PATENT DOCUMENTS

DE 10328015 A1 1/2005
DE 102019201953 A1 8/2020
FR 2893983 A1 6/2007

OTHER PUBLICATIONS

Gong, et al.: "Memorizing Normality to Detect Anomaly: Memory-augmented Deep Autoencoder for Unsupervised Anomaly Detection", Computer Vision Foundation, (2019), pp. 1705-1714.
(Continued)

*Primary Examiner* — Lindsay M Low
(74) *Attorney, Agent, or Firm* — Norton Rose Fulbright US LLP

(57) ABSTRACT

A method for detecting manipulation of a technical device, particularly a technical device in a motor vehicle, especially an exhaust-gas treatment device. The method includes: providing a time series of an input vector having one or more system variables and having at least one manipulated variable for an intervention in the technical device; utilizing a data-based manipulation detection model which includes a recurrent neural network that is designed to determine a state vector as a function of the input vector, and an autoencoder which is designed to determine a reconstructed vector as a function of the state vector, detecting an anomaly as a function of a reconstruction error, which is a function of the reconstructed vector; and detecting a manipulation as a function of the reconstruction error.

8 Claims, 2 Drawing Sheets

(58) Field of Classification Search
CPC .......... F01N 3/00; G06N 3/045; G06N 3/088;
G06N 3/044; G06N 3/08; Y02T 10/40
See application file for complete search history.

(56) References Cited

U.S. PATENT DOCUMENTS

| 2018/0159879 A1* | 6/2018 | Mestha | ................. | G06N 3/084 |
| 2019/0218954 A1* | 7/2019 | Ragaller | ................. | F01N 11/00 |
| 2020/0292608 A1* | 9/2020 | Yan | ........................ | G06N 3/044 |

OTHER PUBLICATIONS

Niu and WU: "LSTM-Based VAE-GAN for Time-Series Anomaly Detection," sensors 20 (3738), (2020), pp. 1-13.

* cited by examiner

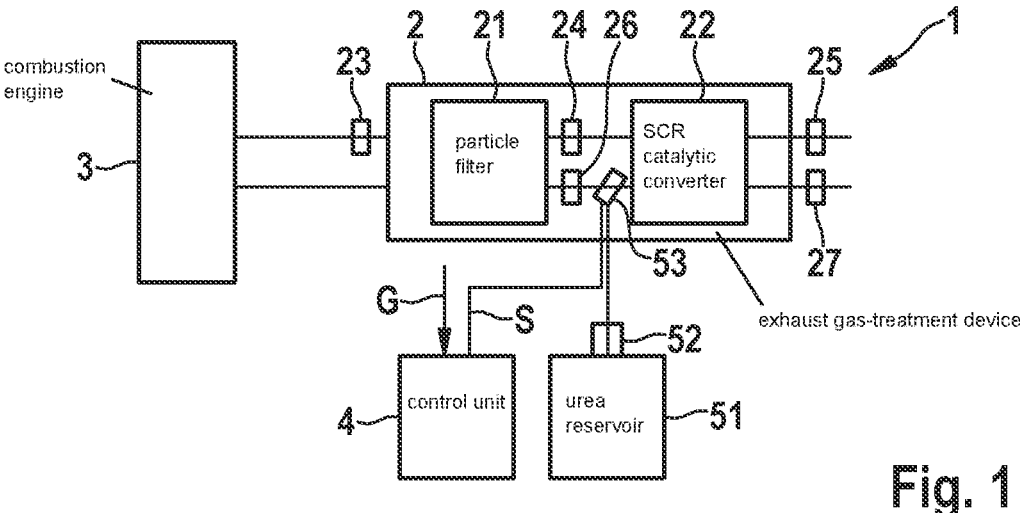

combustion engine

3

23

2　21　24　26　22　　25　　1 particle filter

SCR catalytic converter

53

27 exhaust gas-treatment device

G

S

52

4　control unit urea reservoir　51

Fig. 1

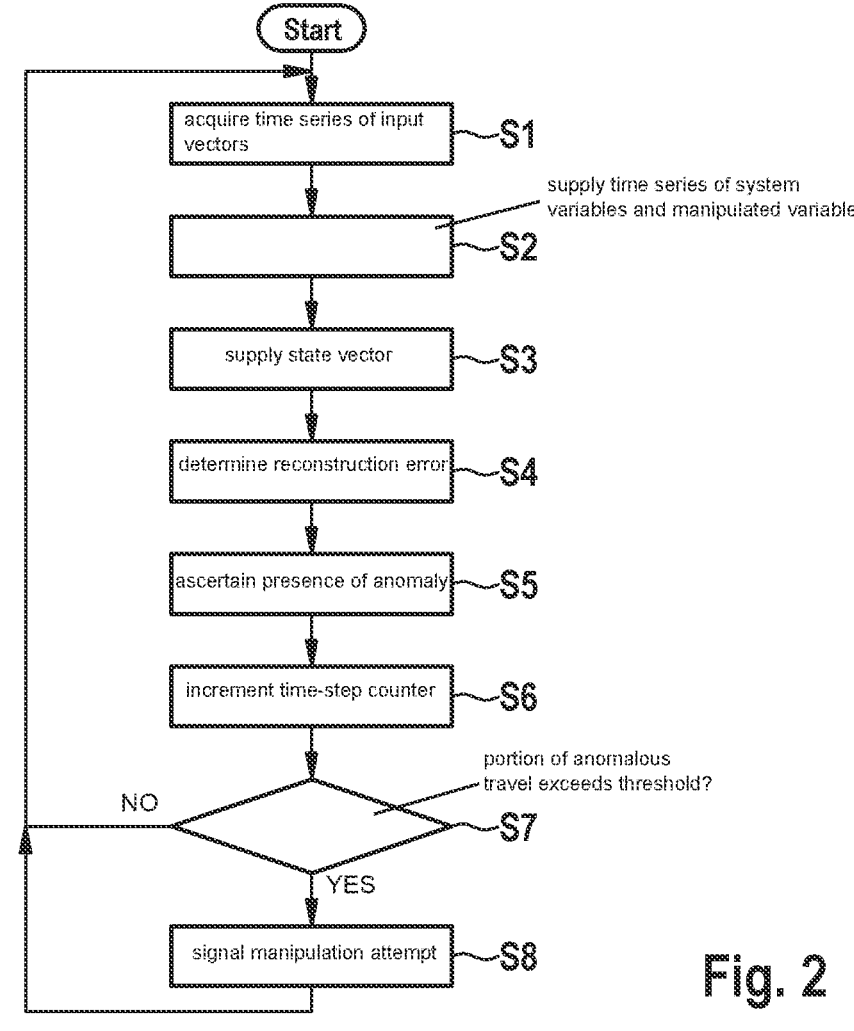

Start acquire time series of input vectors — S1 supply time series of system variables and manipulated variable

S2 supply state vector — S3 determine reconstruction error — S4 ascertain presence of anomaly — S5 increment time-step counter — S6 portion of anomalous travel exceeds threshold?

NO

S7

YES signal manipulation attempt — S8

Fig. 2

METHOD AND APPARATUS FOR DETECTING MANIPULATION OF A TECHNICAL DEVICE IN A MOTOR VEHICLE UTILIZING METHODS OF ARTIFICIAL INTELLIGENCE

CROSS REFERENCE

The present application claims the benefit under 35 U.S.C. § 119 of German Patent Application No. DE 102020210727.0 filed on Aug. 25, 2020, which is expressly incorporated herein by reference in its entirety.

FIELD

The present invention relates to motor vehicles, and particularly methods for detecting manipulation of devices in motor vehicles. In addition, the present invention relates to exhaust-gas treatment devices and methods for detecting a manipulation and for diagnosing exhaust-gas treatment devices.

BACKGROUND INFORMATION

Technical devices in motor vehicles can be manipulated in illegal manner in order to achieve operation advantageous for the driver. Thus, an exhaust-gas treatment device may be manipulated to enhance performance of the engine system or to reduce the consumption of material, particularly urea.

Methods for detecting a manipulation are usually rule-based. Rule-based manipulation monitoring methods have the disadvantage that only known manipulation strategies are able to be detected, that is, only familiar manipulations are able to be caught. Such a defense strategy is therefore oblivious to new types of manipulations. Moreover, it is costly to include a complex technical system with its dependencies in one control system and to provide suitable rules for detecting a manipulation.

For example, because of its dynamic behavior, the operating states for an exhaust-gas treatment device are numerous and, particularly in the case of seldom-occurring system states, cannot be attributed beyond doubt to the presence of a manipulation. For instance, today's SCR exhaust-gas treatment systems (SCR: Selective Catalytic Reduction) for denitration (reducing nitrogen by injecting urea into the exhaust gas) are provided with statutory monitoring of the system parameters relevant for a faultless operation. These system parameters are monitored as part of an onboard diagnostic for the observance of physically reasonable limit values, and are thereby plausibilized. In addition, for parameters inherent to the system whose values result from the combination of various manipulated variables of the SCR control, it is possible to check whether the anticipated system reaction sets in after a system intervention. Thus, for example, in response to an increase of the metered quantity of urea under defined conditions, a lowering of the nitrogen-oxide emissions, measured by a downstream NOx sensor, is to be expected.

Increasingly, however, so-called SCR emulators are being used that are able to alter data in a program code of the monitoring system or sensor values which the monitoring system uses, in such a way that error detections by the monitoring system are impossible, even though the SCR system is active only to a limited extent or not at all. As a consequence, maintenance expenditure in the vehicle operation may be reduced and costs for the refueling of urea may be saved, while accepting an increased emission of nitrogen oxide. The conventional diagnostic functions are deceived by the emulated sensor signals, which makes detection of the manipulation difficult.

SUMMARY

According to the present invention, a method for detecting manipulation in a technical device, particularly a technical device in a motor vehicle, especially an exhaust-gas treatment device, as well as an apparatus and a technical system according to the alternative independent claims are provided.

Developments and example embodiments of the present invention are disclosed herein.

According to a first aspect of the present invention, a method is provided for detecting manipulation of a technical device, particularly a technical device in a motor vehicle, especially an exhaust-gas treatment device. In accordance with an example embodiment of the present invention, the method includes the following steps:

Providing a time series of an input vector having one or more system variables and having at least one manipulated variable for an intervention in the technical device;

Utilizing a data-based manipulation detection model which includes a recurrent neural network that is designed to determine a state vector as a function of the input vector, and an autoencoder which is designed to determine a reconstructed vector as a function of the state vector;

Detecting an anomaly as a function of a reconstruction error, which is a function of the reconstructed vector;

Detecting a manipulation as a function of the reconstruction error.

The technical device may include an exhaust-gas treatment device, the input vector including a manipulated variable for a urea injection system as the manipulated variable.

According to the method above, it is provided to use a machine learning method to detect manipulation of a technical device in a motor vehicle. With the aid of a data-based manipulation detection model, a normal behavior of the underlying technical device is learned, and a deviation from its normal behavior is regarded as the result of a manipulation.

With the aid of deep learning methods, dependencies and properties of the technical device that are important for the underlying manipulation detection are able to be recognized autonomously. Since a normal behavior of the technical device is trained in the manipulation detection model during running operation, behavior of the technical device deviating from that is able to be detected. This has the advantage that even new and, until now, unknown manipulation attempts are able to be detected by such a manipulation detection model.

In accordance with an example embodiment of the present invention, the method provides a manipulation detection, in which a recurrent neural network (RNN) is used in combination with an autoencoder structure. The RNN-autoencoder structure is trained basically to use a time series of an input vector and to process this time series in an RNN such as a LSTM (Long Short-Term Memory), for example, to form a state vector. The input vector includes one or more system variables, at least one manipulated variable for an intervention in the technical device as well as, optionally, at least one system parameter with respect to a time step. The time series of the input vector corresponds to a series of input vectors with respect to successive time steps, in which the method described is carried out cyclically. The time series of the input vector thus corresponds to the time series of the one or more system variables, of the at least one manipulated variable for an intervention in the technical device, and optionally of the at least one system parameter.

The state vector maps the behavior of the technical device, that is, the time series of the input vector is processed in the trained RNN network to form a state vector. The state vector is thus a function of the time series of the input vector.

A state vector may be determined for each time step from the input vector with the aid of the recurrent neural network, the autoencoder being trained to map the state vector onto the input vector, the reconstruction error indicating a difference between the input vector and the input vector reconstructed by the autoencoder.

With the aid of the recurrent network, from the time series of the input vectors for each time step, a state vector is thus formed, which preferably may have a higher dimension than the input vector. A conventional autoencoder based on a deep neural network is subsequently used to detect an anomaly in the time series of the input vectors. The autoencoder is trained to map the state vector from the recurrent network in each time step onto an input vector of the same time step.

In order to detect an anomaly during operation of the technical device, a reconstruction error of the autoencoder is evaluated. In so doing, a deviation between the input vector and the reconstructed input vector is evaluated. Specifically, the reconstruction error may be determined with the aid of a predetermined error function which, in particular, is based on a Mean Squared Error, a Huber-Loss-Function or a Root-Mean Squared Error between the original input vector and the reconstructed vector.

Time steps at regular intervals, at which the behavior of the technical device is evaluated, may be specified. They are classified in each instance as anomaly or normal behavior depending on the reconstruction error. A manipulation of the technical device may be recognized on the basis of the percentage of the anomalies detected over the time steps.

A reconstruction error may be determined as a function of a difference between the input vector and the reconstructed input vector in a time step, in order to indicate an anomaly for each time step.

According to one specific example embodiment of the present invention, a reconstruction error may be ascertained as a function of the reconstructed vector in successive time steps in order to determine the presence of an anomaly for each time step, a manipulation of the technical device being detected, that is, an anomalous behavior of the technical device being signaled if the portion of anomalies over the time steps exceeds a predetermined portion threshold value.

Furthermore, a state vector may be determined for each time step from the input vector with the aid of the recurrent network, the autoencoder being trained to map the state vector onto itself, the reconstruction error indicating a difference between the state vector and a state vector reconstructed by the autoencoder.

An anomaly in a time step may be detected by specifying an individual error threshold value for each of the one or more system variables and the at least one manipulated variable, an anomaly in a time step being recognized if a predetermined number of the one or more system variables and of the at least one manipulated variable exceeds the respective individual error threshold value.

In particular, the individual error threshold value may be determined with the aid of a validation data record, the error threshold value being selected for each of the one or more system variables and the at least one manipulated variable in such a way that according to a predetermined percentile, no error is detected.

According to one specific example embodiment of the present invention, a detected manipulation may be signaled, or the technical device may be operated subject to the manipulation detected.

According to a further aspect of the present invention, an apparatus is provided for detecting manipulation of a technical device, particularly a technical device in a motor vehicle, especially an exhaust-gas treatment device. In accordance with an example embodiment of the present invention, the apparatus is configured to:

Provide a time series of an input vector having one or more system variables and having at least one manipulated variable for an intervention in the technical device;

Utilize a data-based manipulation detection model which includes a recurrent neural network that is designed to determine a state vector as a function of the input vector, and an autoencoder which is designed to determine a reconstructed vector as a function of the state vector, Detect an anomaly as a function of a reconstruction error, which is a function of the reconstructed vector;

Detect a manipulation as a function of the reconstruction error.

BRIEF DESCRIPTION OF THE DRAWINGS

Specific example embodiments of the present invention are explained in greater detail below with the aid of the figures.

FIG. 1 shows a schematic representation of an exhaust-gas treatment device as an example for a technical system, in accordance with the present invention.

FIG. 2 shows a flowchart to illustrate a method for detecting manipulation of the exhaust-gas treatment device of FIG. 1, in accordance with an example embodiment of the present invention.

DETAILED DESCRIPTION OF EXAMPLE EMBODIMENTS

Figure 3:
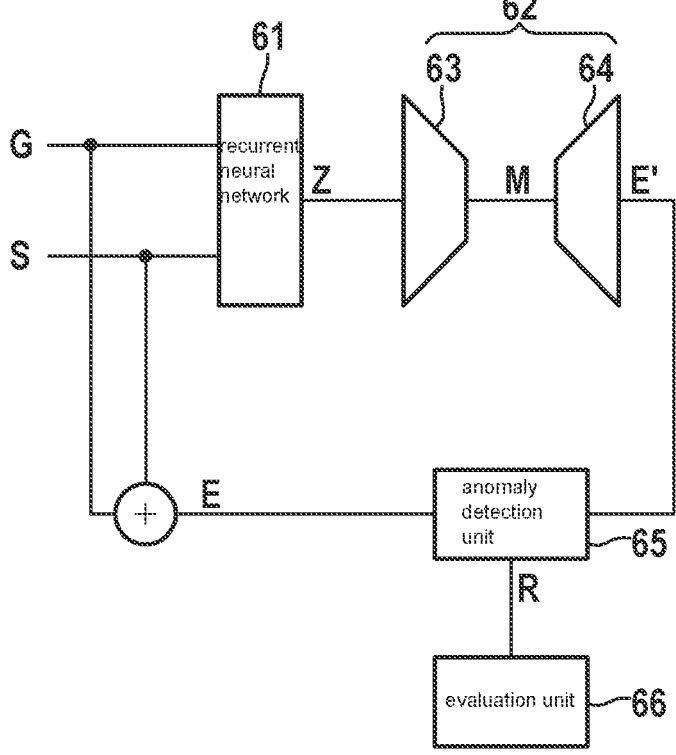
FIG. 3 shows a schematic representation of a network structure of an autoencoder based on evaluation of time series of input vectors for use in detecting manipulation, in accordance with an example embodiment of the present invention.

FIG. 1 shows a schematic representation of an exhaust-gas treatment system 2 for an engine system 1 having a combustion engine 3. Exhaust-gas treatment device 2 is designed for the treatment of combustion exhaust gases of combustion engine 3. Combustion engine 3 may take the form of a diesel engine.

Exhaust-gas treatment device 2 has a particle filter 21 and an SCR catalytic converter 22. Upstream of particle filter 21, downstream of particle filter 21 and downstream of SCR catalytic converter 22 the exhaust-gas temperature is measured by a temperature sensor 23, 24, 25, respectively, and upstream and downstream of SCR catalytic converter 22, the NOx content is measured by a NOx sensor 26, 27, respectively, and processed in a control unit 4. The sensor signals are provided to the control unit as system variables G.

A urea reservoir 51, a urea pump 52 and a controllable injection system 53 for the urea are provided. Injection system 53, controlled by control unit 4 with the aid of a beginning of page manipulated variable S, makes it possible to feed a predetermined quantity of urea into the combustion exhaust gas upstream of SCR catalytic converter 22.

Control unit 4 controls, according to conventional methods, the feed of urea upstream of SCR catalytic converter 22 by specifying a manipulated variable for injection system 53 in order to achieve the best possible catalyzation of the combustion exhaust gases, so that the nitrogen-oxide content is reduced as much as possible.

Conventional manipulation devices manipulate sensor signals and/or control signals in order to reduce or completely stop the consumption of urea.

Such manipulations may indeed be detected by rule-based monitoring of operating states of the exhaust-gas treatment device, however not all relevant unauthorized operating states are able to be checked in this way. That is why a manipulation detection method is provided based on a manipulation detection model. It may be carried out in control unit 4, as illustrated by way of example with the aid of the flowchart of FIG. 2. The method may be implemented in control unit 4 as software and/or hardware.

In step S1, time series of input vectors formed of system variables G and manipulated variable S are acquired for injection system 53 for the urea. System variables G may include one or more of the following variables: the exhaust-gas temperatures above, the NOx concentrations above, an instantaneous engine torque, an instantaneous air charge of combustion engine 3, a rotational speed of combustion engine 3, an injected quantity of fuel of combustion engine 3, a pressure in the exhaust-gas system, an NH3 concentration, an oxygen concentration in the combustion exhaust gas, a DeNOX efficiency (DeNOX efficiency is determined on the basis of the NOx concentrations upstream and downstream of the SCR catalytic converter), an engine temperature, an engine torque required by driver, e.g., given by an accelerator-pedal position, a vehicle speed, an ambient pressure, an ambient temperature, a gear selection of the gear shift, a vehicle weight, a position of an exhaust gas recirculation valve, and a quantity of soot in the combustion exhaust gas.

With the aid of the manipulation detection model, the time series of the input vectors (formed from system variables G and manipulated variable S) is evaluated in order to detect an anomaly in the behavior of exhaust-gas treatment device 2. To that end, in step S2, the time series of system variables G and of manipulated variable S are supplied to the manipulation detection model, as shown by way of example in FIG. 3.

Manipulation detection model 60 has a recurrent neural network 61 in order, in a conventional manner, to assign a state vector Z to the time series of system variables G and of manipulated variable S. For example, recurrent neural network 61 may be a LSTM (Long Short-Term Memory), a GRU unit (Gated Recurrent Unit) or any other recurrent structure which is able to map time dynamics. Recurrent neural networks share in common that they generate a state vector (hidden state) in each time step of the time series of the input vector.

The dimension of state vector Z of recurrent neural network 61 may be selected as desired, however, it has been shown that the reliability of the anomaly detection is better if state vector Z has a higher dimension than the input vector formed from system variables G and manipulated variable S Recurrent neural network 61 is trained for the proper operating condition of exhaust-gas treatment device 2. State vector Z thus characterizes the behavior of exhaust-gas treatment device 2. In particular, recurrent neural network 61 is trained to map the time series of system variables G and of manipulated variable S onto a state vector Z which, in the ideal case, does not change independently of the dynamic behavior of exhaust-gas treatment device 2.

In step S3, state vector Z is supplied subsequently to an autoencoder 62 having an encoder part 63 and a decoder part 64. Encoder part 63 and decoder part 64 may take the form of a deep neural network made of fully connected layers. The activation functions, such as Leaky-ReLU or the like, may likewise be freely selected.

Encoder part 63 of autoencoder 62 compresses state vector Z to a feature vector M of reduced dimension (than state vector Z), and decoder part 64 expands feature vector M to the original input vector of the same time step.

In step S4, in an anomaly detection unit 65, a reconstruction error R is determined between reconstructed input vector E' at the output of decoder part 64 and input vector E present at the input of recurrent neural network 61. The output layer of decoder part 64 should have the quantity of input vector E, in order to reconstruct respective input vector E'.

The reconstruction error for detecting an anomaly in the behavior of exhaust-gas treatment device 2 may be calculated signal-wise, that is, for each time step, in anomaly detection unit 65. For instance, the reconstruction error may be determined as L2-Norm.

The presence of an anomaly may now be ascertained in step S5 in an evaluation unit 66 as a function of a comparison of the reconstruction error to an error threshold value. The error threshold value may be permanently fixed or may be ascertained separately as a percentile value signal-wise, that is, for each system variable G and manipulated variable S, respectively, (input vector quantity). The percentile value corresponds to a parameter which may be determined in a manner known per se with the aid of the validation data record. The validation data record represents a time series of the input vector, which maps a normal operation of exhaust-gas treatment device 2.

The validation data record is used to determine (signal-wise) the reconstruction errors between input vectors E and their reconstruction. In this context, the error threshold value for each input vector quantity is selected in such a way that, according to a predetermined percentile, no error is detected. For example, a percentile between 99.9 and 99.99% may be predetermined for each input vector quantity. From this, in each case percentile values are derived for each of the input vector quantities.

An anomaly in the time step in question is recognized if the reconstruction error exceeds the percentile value in the case of at least one of the input vector quantities. For that purpose, in step S6, a time-step counter may be incremented for each time step, and an anomaly counter may be incremented if an anomaly has been detected.

A portion/percentage may be ascertained from the counter contents during ongoing operation, which indicates in how many of the time steps the input vector was recognized as anomalous relative to all time steps considered. By a threshold-value comparison of a predetermined portion to a portion threshold value, in step S7 it may be determined what percentage of the travel since the beginning of operation was recognized as anomalous. If this value of the portion exceeds the predetermined portion threshold value (alternative: yes), a manipulation attempt may be inferred, and this may be signaled accordingly in step S8. Otherwise (alternative: no), the method is continued with step S1

The manipulation detection model may be trained over several epochs in a conventional manner. In so doing, all training data are processed in each epoch. The training data correspond to time series of system variables and of the manipulated variable which were recorded in a tamperproof operating environment of exhaust-gas treatment device 2. The time series of the input vector (system variables G and manipulated variable S) for the training data may include values from, e.g., 500 to 3000 time steps. To train the manipulation detection model, recurrent neural network 61 and autoencoder 62 may be trained in such a way that input vector E at each time step corresponds to reconstructed input vector E' obtained on the output side of the autoencoder. The error function for training the manipulation detection model may then use the Mean Squared Error or the Root-Mean-Squared Error between the reconstructed input vector and the original input vector.

In an alternative specific embodiment of the present invention, autoencoder 62 may be designed or trained to map state vector Z at each time step onto state vector Z, which includes system variables G and manipulated variable S.

In this case, the reconstruction error may be determined between the reconstructed state vector and original state vector Z.

To determine the reconstruction error, a corresponding error function may be ascertained based on the Mean Squared Error, a Huber-Loss-Function or the Root-Mean Squared Error between the original input vector and the reconstructed input vector. The error value ascertained may be propagated with the aid of back propagation in order to train the network parameters; a gradient descent method such as SGD, Adam, AdamW or AdaGrad customary for neural networks may be used as optimization strategy.

What is claimed is:

1. A method for detecting manipulation of an exhaust-gas treatment device in a motor vehicle, the method comprising the following:

performing, during operation of the exhaust-gas treatment device, the following steps:

acquiring a time series of an input vector having one or more system variables and having at least one manipulated variable for controlling a urea injection system of the exhaust-gas treatment device, the time series including the input vector acquired at a plurality of successive respective time steps, supplying the acquired time series of the input vector to a data-based manipulation detection model which includes a recurrent neural network that is configured to determine respective state vectors, the recurrent neural network determining each of the respective state vectors as a function of the input vector at a successive respective time step of the time series, and an autoencoder which is configured to determine, for each successive respective time step of the time series, a respective reconstructed vector as a function of the respective state vector of the successive respective time step, wherein the recurrent neural network is trained for a normal operation condition of the exhaust-gas treatment device, determining, for each successive respective time step of the time series, a reconstruction error as a function of the respective reconstructed vector of the successive respective time step and the input vector at the successive respective time step, detecting, based on each of the reconstruction errors, a respective anomaly in a behavior of the exhaust-gas treatment device as a function of the reconstruction error, counting the detected respective anomalies using an anomaly counter;

ascertaining, based on contents of the anomaly counter, a portion that indicates how many of the time steps were detected as anomalous as compared to a count of all of the time steps;

comparing the portion to a predetermined portion value; and detecting a manipulation of the exhaust-gas treatment device as a function of the comparison.

2. The method as recited in claim 1, wherein the reconstruction errors indicates a difference between the input vector at each successive respective time step and the input vector reconstructed by the autoencoder at the successive respective time step.

3. The method as recited in claim 1, wherein the reconstruction errors determined with the aid of a predetermined error function, which is based on a Mean Squared Error or a Huber-Loss-Function or a Root-Mean Squared Error, between the input vector at each successive respective time step and the reconstructed vector at the successive respective time step.

4. The method as recited in claim 1, wherein each respective anomaly is detected in each successive respective time step by specifying a respective individual error threshold value for each of the one or more system variables and the at least one manipulated variable, an anomaly being detected in the successive respective time step when a predetermined number of the one or more system variables and of the at least one manipulated variable exceeds the respective individual error threshold value.

5. The method as recited in claim 4, wherein each respective individual error threshold value is determined using a validation data record, the respective individual error threshold value for each of the one or more system variables and the at least one manipulated variable being selected in such a way that according to a predetermined percentile, no error is detected.

6. The method as recited in claim 1, wherein the detected manipulation is signaled, or wherein the exhaust-gas treatment device is operated subject to the detected manipulation.

7. An apparatus for detecting manipulation of an exhaust-gas treatment device in a motor vehicle, the apparatus being configured to:

during operation of the exhaust-gas treatment device, the apparatus configured to:

acquire a time series of an input vector having one or more system variables and having at least one manipulated variable for controlling a urea injection system of the exhaust-gas treatment device, the time series including the input vector acquired at a plurality of successive respective time steps, supply the acquired time series of the input vector to a data-based manipulation detection model which includes a recurrent neural network that is configured to determine respective state vectors, the recurrent neural network determine each of the respective state vectors as a function of the input vector at a successive respective time step of the time series, and an autoencoder which is configured to determine, for each successive respective time step of the time series, a respective reconstructed vector as a function of the respective state vector of the successive respective time step, wherein the recurrent neural network is trained for a normal operation condition of the exhaust-gas treatment device, determine, for each successive respective time step of the time series, a reconstruction error as a function of the respective reconstructed vector of the successive respective time step and the input vector at the successive respective time step, detect, based on each of the reconstruction errors, a respective anomaly in a behavior of the exhaust-gas treatment device as a function of the reconstruction error, count the detected respective anomalies using an anomaly counter;

ascertain, based on contents of the anomaly counter, a portion that indicates how many of the time steps were detected as anomalous as compared to a count of all of the time steps;

compare the portion to a predetermined portion value; and detect a manipulation of the exhaust-gas treatment device as a function of the comparison.

8. A non-transitory machine-readable storage medium on which are stored commands for detecting manipulation of an exhaust-gas treatment device in a motor vehicle, the commands, when executed by a computer, causing the computer to perform the following:

performing, during operation of the exhaust-gas treatment device, the following steps:

acquiring a time series of an input vector having one or more system variables and having at least one manipulated variable for controlling a urea injection system of the exhaust-gas treatment device, the time series including the input vector acquired at a plurality of successive respective time steps, supplying the acquired time series of the input vector to a data-based manipulation detection model which includes a recurrent neural network that is configured to determine respective state vectors, the recurrent neural network determining each of the respective state vectors as a function of the input vector at a successive respective time step of the time series, and an autoencoder which is configured to determine, for each successive respective time step of the time series, a respective reconstructed vector as a function of the respective state vector of the successive respective time step, wherein the recurrent neural network is trained for a normal operation condition of the exhaust-gas treatment device, determining, for each successive respective time step of the time series, a reconstruction error as a function of the respective reconstructed vector of the successive respective time step and the input vector at the successive respective time step, detecting, based on each of the reconstruction errors, a respective anomaly in a behavior of the exhaust-gas treatment device as a function of the reconstruction error, counting the detected respective anomalies using an anomaly counter;

ascertaining, based on contents of the anomaly counter, a portion that indicates how many of the time steps were detected as anomalous as compared to a count of all of the time steps;

comparing the portion to a predetermined portion value; and detecting a manipulation of the exhaust-gas treatment device as a function of the comparison.

\* \* \* \* \*